US011460695B2

(12) United States Patent
Lee et al.

(10) Patent No.: US 11,460,695 B2
(45) Date of Patent: Oct. 4, 2022

(54) DISPLAY APPARATUS

(71) Applicant: SAMSUNG ELECTRONICS CO., LTD., Suwon-si (KR)

(72) Inventors: Kyehoon Lee, Suwon-si (KR); Jigwang Kim, Suwon-si (KR); Jiwon Kim, Suwon-si (KR); Jaemin Soh, Suwon-si (KR); Sanghoon Lee, Suwon-si (KR); Daesu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/091,591

(22) Filed: Nov. 6, 2020

(65) Prior Publication Data

US 2021/0149193 A1 May 20, 2021

(30) Foreign Application Priority Data

Nov. 20, 2019 (KR) .................. 10-2019-0149894

(51) Int. Cl.
*G02B 27/01* (2006.01)
*G02F 1/1335* (2006.01)
*G02F 1/017* (2006.01)

(52) U.S. Cl.
CPC ... *G02B 27/0101* (2013.01); *G02F 1/133555* (2013.01); *G02B 2027/0112* (2013.01); *G02F 1/01791* (2021.01)

(58) Field of Classification Search
CPC .. G02B 6/0031; G02B 6/0025; G02B 6/0053; G02F 1/1334; G02F 1/133603; G02F 1/1337; G02F 1/13334; G02F 1/133606; G02F 1/1336; G02F 1/133612; G02F 1/133601; G02F 1/133607
See application file for complete search history.

(56) References Cited

U.S. PATENT DOCUMENTS

| 6,160,666 | A | * | 12/2000 | Rallison | ............ | G02B 27/0101 345/7 |
|---|---|---|---|---|---|---|
| 8,921,473 | B1 | | 12/2014 | Hyman | | |
| 9,744,800 | B2 | | 8/2017 | Hyman | | |
| 9,989,763 | B2 | | 6/2018 | Woltman et al. | | |
| 10,037,689 | B2 | | 7/2018 | Taylor | | |
| 10,109,054 | B1 | | 10/2018 | Wilson et al. | | |
| 2008/0029710 | A1 | * | 2/2008 | Sekiya | ................ | C09K 11/883 250/432 R |

(Continued)

OTHER PUBLICATIONS

Communication dated Apr. 30, 2021 by the European Patent Office in European Patent Application No. 20208756.5.

*Primary Examiner* — Hoan C Nguyen
(74) *Attorney, Agent, or Firm* — Sughrue Mion, PLLC

(57) ABSTRACT

A display apparatus includes a light source array in which a plurality of light sources emitting light by a local dimming are arranged, a color conversion layer comprising color conversion particles that convert the emitted light into light of a certain color, and configured to emit white light by using the converted light, a display panel configured to generate an image by using the white light, and a selective transmission member arranged between the light source array and the color conversion layer. The selective transmission member is configured to transmit the light to the color conversion layer, and avoid transmitting the light in the color conversion layer to the light source array.

18 Claims, 9 Drawing Sheets

(56) References Cited

U.S. PATENT DOCUMENTS

| | | | |
|---|---|---|---|
| 2011/0038150 A1* | 2/2011 | Woodgate | G02B 19/0066 362/235 |
| 2015/0323711 A1* | 11/2015 | Bessho | G02B 5/0242 349/71 |
| 2015/0345745 A1* | 12/2015 | Asadi | H01L 33/644 362/84 |
| 2016/0033823 A1* | 2/2016 | Lee | G02F 1/133617 349/71 |
| 2018/0120639 A1 | 5/2018 | Shih et al. | |
| 2018/0348577 A1* | 12/2018 | Pousthomis | H01L 27/322 |
| 2019/0002759 A1* | 1/2019 | D'Amico | H01L 33/502 |
| 2019/0093008 A1* | 3/2019 | Shin | C09K 11/06 |
| 2019/0285950 A1 | 9/2019 | Liu et al. | |
| 2020/0258867 A1* | 8/2020 | Harrold | G02B 5/22 |
| 2020/0301204 A1* | 9/2020 | Wang | G02B 6/0031 |

* cited by examiner

DISPLAY APPARATUS

CROSS-REFERENCE TO RELATED APPLICATION(S)

This application is based on and claims priority under 35 U.S.C. § 119 to Korean Patent Application No. 10-2019-0149894, filed on Nov. 20, 2019, in the Korean Intellectual Property Office, the disclosure of which is incorporated by reference herein in its entirety.

BACKGROUND

1. Field

The disclosure relates to a display apparatus, and more particularly, to a display apparatus capable of performing local dimming.

2. Description of Related Art

A display apparatus that displays an image is an apparatus that uses a display panel to display the image and is used in various devices such as televisions (TVs), computer monitors, smartphones, etc. However, a general display apparatus needs a backlight unit including a separate light source because it is not capable of self-emitting light, and the display panel locates the backlight unit at the rear of a liquid crystal display (LCD).

The backlight unit is a dimming device that irradiates light uniformly over the entire display panel, and a display panel including a general backlight unit uses a light-emitting diode (LED) of a certain color as a light source.

Meanwhile, the backlight unit includes a light guide plate that diffuses light, thus uniformly emitting light. However, there is a limitation in achieving local dimming that differentiates a brightness according to a position.

SUMMARY

Embodiments of the disclosure provide a display apparatus capable of performing local dimming to improve a contrast ratio.

Additional aspects will be set forth in part in the description which follows and, in part, will be apparent from the description, or may be learned by practice of the presented embodiments of the disclosure.

In accordance with an aspect of the disclosure, a display apparatus includes a light source array in which a plurality of light sources emitting light in a local dimming manner are arranged, a color conversion layer including color conversion particles that convert the light into light of a certain color and emitting white light by using the light, a display panel configured to generate an image by using the white light, and a selective transmission member arranged between the light source array and the color conversion layer and transmitting the light to the color conversion layer and avoiding transmitting the light converted in the color conversion layer to the light source array.

The selective transmission member may totally reflect the converted light incident thereon.

The selective transmission member may include a transmissivity and a reflectivity that change with an incidence angle of the light.

Out of the light, light incident on the selective transmission member at an incidence angle equal to or greater than a certain angle may include a reflectivity that is greater than a transmissivity thereof with respect to the selective transmission member.

The certain angle may be determined based on a size of the local dimming and a distance between the light source array and the selective transmission member.

A transmissivity of a first region corresponding to a light source, which emits the light, of the selective transmission member may be greater than a transmissivity of a second region not corresponding to the light source, which emits the light, of the selective transmission member.

The first region may include a region overlapping with the light source that emits the light.

The transmissivity of light of the second region may be less than or equal to 30% of the transmissivity of light of the second region.

The selective transmission member may include a combination of a plurality of material layers having different refractive indices.

The color conversion particles may include quantum dost (QDs).

The display apparatus may further include a plurality of barriers arranged spaced in parallel in a direction in which the plurality of light sources are arranged in the color conversion layer.

The plurality of barriers may be arranged in a region of the color conversion layer, which does not overlap with the plurality of light sources.

At least one of the plurality of barriers may include a reflective material.

The color conversion layer may further include a first color conversion layer including first color conversion particles that convert blue light into green light and a second color conversion layer including second color conversion particles that convert the blue light into red light.

The display apparatus may further include another selective transmission member arranged between the first color conversion layer and the second color conversion layer, and transmitting the blue light and the green light and reflecting the red light.

The display apparatus may further include an electro-optic layer capable of adjusting a transmissivity of the light with respect to the selective transmission member based on optical characteristics thereof that change with an applied electric signal and an electrode part applying the electric signal to the electro-optic layer.

The electrode part may include a plurality of electrode pairs arranged corresponding to each of the plurality of light sources with the electro-optic layer therebetween.

The electro-optic layer may include at least one of liquid crystal or electro-wetting material having optical characteristics that change with an applied electric signal.

The display apparatus may further include an image enlargement member configured to enlarge the image generated in the display panel and an image convergence member configured to converge the enlarged image and an image corresponding to an external environment into a certain space.

The image convergence member may include at least one of a beam splitter, a transflective film, a fold mirror, or an anisotropic mirror.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
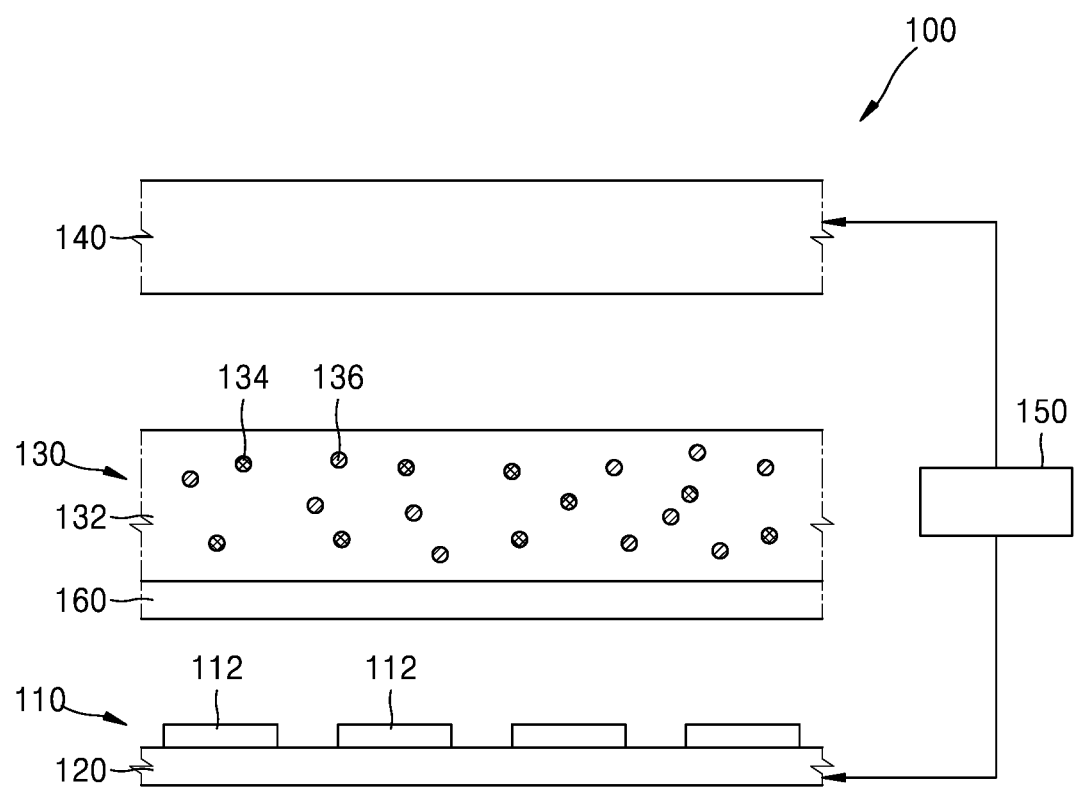
FIG. 1 illustrates an example of a display apparatus according to an embodiment.

Hereinafter, a display apparatus according to various embodiments of the disclosure will be disclosed with reference to the accompanying drawings. The width and thickness of layers or regions illustrated in the accompanying drawings may be exaggerated for clarity of the specification and convenience of explanation. Throughout the detailed description, identical reference numerals refer to identical elements.

Terms such as "comprise" and "include" used in the embodiments of the disclosure should not be interpreted as including all of elements or operations described herein, and should be interpreted as excluding some of the elements or operations or as further including additional elements or operations.

Throughout the disclosure, the expression "at least one of a, b or c" indicates only a, only b, only c, both a and b, both a and c, both b and c, all of a, b, and c, or variations thereof.

Hereinbelow, an expression such as "above" or "on" may include not only the meaning of "immediately on/under/to the left/to the right in a contact manner", but also the meaning of "on/under/to the left/to the right in a non-contact manner". Hereinafter, embodiments of the disclosure of the disclosure will be described in detail for illustration with reference to the accompanying drawings.

Terms such as first, second, and the like may be used to describe various elements, but the elements should not be limited to those terms. These terms may be used for the purpose of distinguishing one element from another element.

FIG. 1 illustrates an example of a display apparatus 100 according to an embodiment.

Referring to FIG. 1, the display apparatus 100 may include a light source array 110 in which a plurality of light sources 112 are arranged, a color conversion layer 130 that emits white light LW by using light emitted from the light source array 110, and a display panel 140 that outputs an image by using the white light LW.

In the light source array 110, the plurality of light sources 112 may be arranged two-dimensionally. Each of the plurality of light sources 112 may emit light. The light source 112 may include a light-emitting diode (LED). The LED may be provided in the form of a package in which an LED chip is mounted on a substrate and resin is filled. However, unlike in the current embodiment of the disclosure, as the light source 112, a cold cathode fluorescent lamp (CCFL) or an external electrode fluorescent lamp (EEFL) may be used.

The light source 112 may emit light of a certain color. Herein, the light of the certain color may include light in blue. The light in blue may mean light that has a wavelength of about 400 nm to about 500 nm and is visually seen as blue. The light source 112 may be implemented using a blue light-emitting diode to emit light in blue.

The plurality of light sources 112 may be arranged spaced at certain intervals on a light source substrate 120. The light source substrate 120 may include a light source controller connected with the light source 112. The light source controller may analyze an image displayed on the display panel 140 to output a local dimming signal and control a luminance of light generated by the light source 112 in response to the local dimming signal. For example, the light source controller may independently control the plurality of light sources 112 and group the plurality of light sources 112 to control each group of the light sources 112. In an embodiment, the light source controller may be provided as being mounted on a separate circuit board and a position thereof is not specially limited.

The color conversion layer 130 may include a base layer 132 and a plurality of color conversion particles 134 and 136 that are distributed in the base layer 132 and convert the light into light having a certain color.

The base layer 132 may be formed of a transparent polymer material. For example, the base layer 132 may be transparent cure resin.

Each of the plurality of color conversion particles 134 and 136 may absorb at least a part of incident light and emit light having a certain color or transmit or pass the light therethrough.

When the light incident on the color conversion layer 130 has enough energy to excite the color conversion particles 134 and 136, the color conversion particles 134 and 136 may be excited by absorbing at least a part of the incident light, and may then be stabilized and emit light having a certain color. On the other hand, when the incident light has energy that is not sufficient for exciting the color conversion particles 134 and 136, the incident light may be emitted by passing through the color conversion layer 130.

For example, according to a particle size of a color conversion particle, the color of the light radiated from the color conversion particle may be determined. Overall, for a large particle size, light having a long wavelength may be generated, and for a small particle size, light having a short wavelength may be generated.

According to the current embodiment of the disclosure, each of the color conversion particles 134 and 135 may include a quantum dot (QD). The light emitted from the color conversion particles 134 and 136 of the color conversion layer 130 may be radiated in various directions.

For example, the plurality of color conversion particles 134 and 136 may include a plurality of first color conversion particles 134 and a plurality of second color conversion particles 136. Each of the first color conversion particles 134 may absorb light having a first wavelength band and convert the absorbed light into light having a second wavelength band. A central wavelength of the second wavelength band may be greater than that of the first wavelength band. For example, the first wavelength band may be about 400 nm to about 500 nm, and the second wavelength band may be about 480 nm to about 560 nm. That is, each of the first color conversion particles 134 may substantially convert blue light $L_B$ into green light $L_G$.

Each of the second color conversion particles 136 may absorb the light having the first wavelength band and convert the absorbed light into light having a third wavelength band. A central wavelength of the third wavelength band may be less than that of the second wavelength band. For example, the third wavelength band may be about 640 nm to about 780 nm. That is, each of the second color conversion particles 136 may substantially convert blue light $L_B$ into red light $L_R$.

As described above, according to the size of each of the color conversion particles 134 and 136, a wavelength of light generated by the corresponding color conversion particles 134 and 136 may be determined. According to the current embodiment of the disclosure, the size of each of the first color conversion particles 134 may be less than that of each of the second color conversion particles 136.

Although not shown, the color conversion layer 130 may further include scattering devices. The scattering devices may be mixed with the first color conversion particles 134 and the second color conversion particles 136.

The display panel 140 may be provided in front of the color conversion layer 130 and block or transmit the light emitted from the color conversion layer 130 to form an image. The display panel 140 may be, for example, a liquid crystal display panel 140.

The display panel 140 may include a plurality of pixels. The plurality of pixels included in the display panel 140 may independently block or transmit the light emitted from the color conversion layer 130, and the light passing through the plurality of pixels may form an image. For example, to implement the plurality of pixels, the display panel 140 may include a first polarization film, a transparent substrate, a pixel electrode, a thin film transistor, a liquid crystal layer, a common electrode, a color filter, etc.

A control assembly 150 may include a control circuit that controls operations of the display panel 140 and the light source array 110. The control circuit may process image data received from an external content source and transmit the image data to the display panel 140.

The display apparatus 100 may further include a selective transmission member 160 that is arranged between the light source array 110 and the color conversion layer 130, transmits light incident from the light source array 110 through the color conversion layer 130, and does not transmit the light converted in the color conversion layer 130 toward the light source array 110. The selective transmission member 160 may totally reflect the light converted in the color conversion layer 130 when the converted light is incident thereon.

The selective transmission member 160 may have optical properties including a plurality of different material layers. Incident light satisfying a certain condition may be totally reflected by interaction between the plurality of material layers and the incident light. For example, on an interfacial face between media having different refractive indices, light is refracted and reflected and passes, in which a total amount of reflected light and a total amount of transmitted light may be determined by interference between reflected light and transmitted light in multiple paths caused by a plurality of interfacial faces.

By considering such interference, a refractive index and a thickness of each layer may be determined to totally reflect the light satisfying the certain condition. Based on that the optical properties depend on a wavelength of incident light, the selective transmission member 160 may be designed to totally reflect light having a certain wavelength band, which is incident at a set reference angle, in which a transmissivity and a reflectivity vary with an incidence angle for light having other a different wavelength. The selective transmission member 160 may be referred to as, but not limited to, a dichroic filter.

The refractive index and thickness of the material layer may be determined such that the selective transmission member 160 according to an embodiment transmits light incident from the light source array 110 to the color conversion layer 130 and does not transmit the light converted in the color conversion layer 130 to the light source array 110. For example, the blue light $L_B$ may be emitted to the light source array 110, whereas the light converted in the color conversion layer 130 may be green light $L_G$ or red light $L_R$. Thus, the selective transmission member 160 may selectively transmit or reflect the light according to a wavelength of the incident light.

Figure 2A:
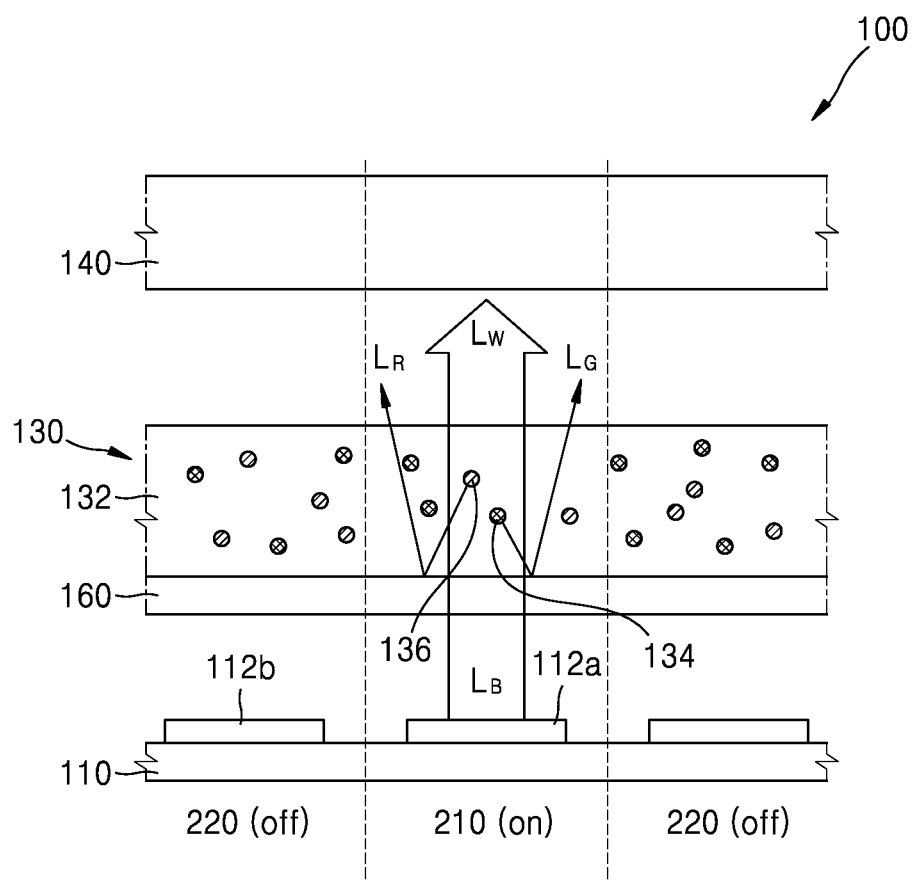
FIG. 2A illustrates a traveling path of light when a selective transmission member is arranged between a light source array and a color conversion layer, according to an embodiment.

FIG. 2A illustrates a traveling path of light when the selective transmission member 160 is arranged between the light source array 110 and the color conversion layer 130, according to an embodiment. To facilitate convenience of a description, the light source array 110 may be assumed to perform local dimming for each light source. Then, a size of local dimming may be a certain range including one light source 112. However, the disclosure is not limited thereto. The size of local dimming may also be a certain range including a plurality of light sources 112.

As shown in FIG. 2A, one light source 112 of the light source array 110 may be in an on state where the light is emitted, and another light source 112 that is adjacent to the light source 112 may be in an off state where the light is not emitted. The light source 112 emitting light may be referred to as an on-light source 112a, and the light source 112 that does not emit light may be referred to as an off-light source 112b. A region in which an image is generated using light mainly emitted from the on-light source 112a to correspond to the on-light source 112a of the display apparatus 100 may be referred to as a dimming-on region 210, and a region corresponding to the off-light source 112b may be referred to as a dimming-off region 220.

The light emitted from the on-light source 112a may be incident to the color conversion layer 130 by passing through the selective transmission member 160. A part of the light may go to the display panel 140 by passing through the color conversion layer 130. A partial light may be incident to the color conversion particles 134 and 136 scattered in the color conversion layer 130. The light incident on the first color conversion particles 134 may be converted into green light $L_G$, and the light incident on the second color conversion particles 136 may be converted into red light $L_R$. Thus, the color conversion layer 130 may emit white light $L_W$ including blue light $L_B$, green light $L_G$, and red light $L_R$.

Meanwhile, the partial converted green light $L_G$ or red light $L_R$ may go to the selective transmission member 160. The converted green light $L_G$ or red light $L_R$ incident to the selective transmission member 160 may be totally reflected from the selective transmission member 160 and emitted toward the display panel 140. A traveling space of the converted green light $L_G$ or red light $L_R$ may be limited in the color conversion layer 130, such that the converted green light $L_G$ or red light $L_R$ may go relatively short in the color conversion layer 130 and thus may be emitted to the display panel 140. Thus, a probability of the converted green light $L_G$ or red light $L_R$ being emitted in the color conversion layer 130 overlapping with the off-light source 112b is low. Hence, a contrast ratio may be improved in local dimming.

Figure 2B:
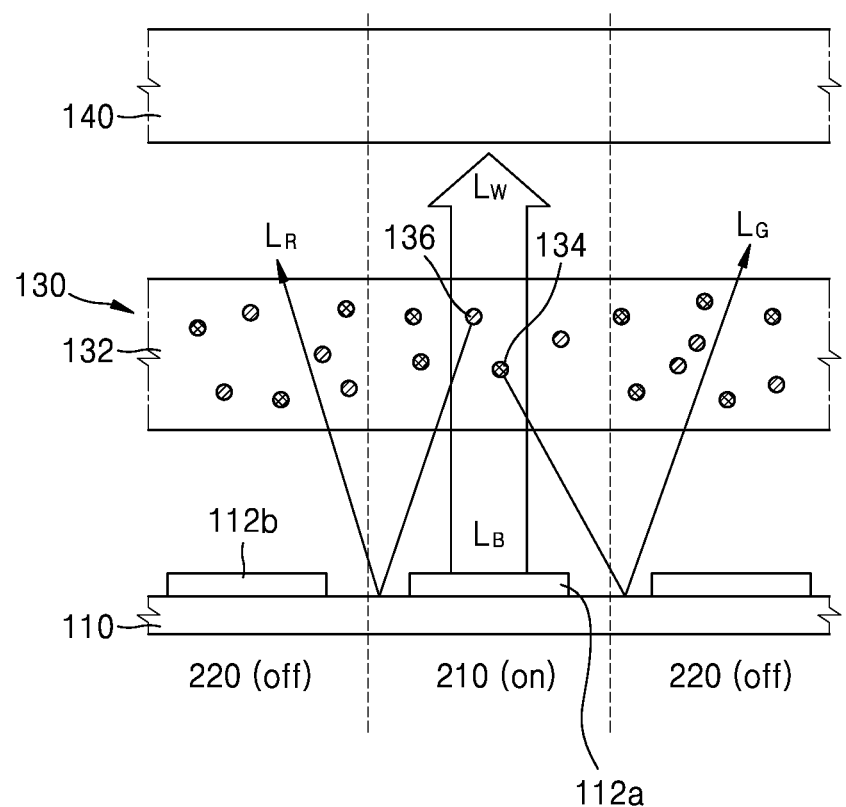
FIG. 2B illustrates a traveling path of light when a selective transmission member is not arranged between a light source array and a color conversion layer, according to an embodiment.

FIG. 2B illustrates a traveling path of light when a selective transmission member is not arranged between a light source array and a color conversion layer, according to an embodiment. As shown in FIG. 2B, the light $L_B$ emitted from the on-light source 112a may be incident to the color conversion layer 130. A part of the light $L_B$ may go to the display panel 140 by passing through the color conversion layer 130. A part of the light $L_B$ may be incident to the color conversion particles 134 and 136 scattered in the color conversion layer 130. The light $L_B$ incident to the first color conversion particles 134 may be converted into the green light $L_G$, and the light $L_B$ incident to the second color conversion particles 136 may be converted into red light $L_R$. Thus, the color conversion layer 130 may emit white light $L_W$ including blue light $L_B$, green light $L_G$, and red light $L_R$.

Meanwhile, a part of the converted green light $L_G$ and red light $L_R$ may go to the light source array 110. Due to absence of the selective transmission member 160, the converted light $L_G$ and light $L_R$ may go to the light source array 110, may be reflected from the light source array 110 and the substrate, and may be incident again to the color conversion layer 130 overlapping with the off-light source 112b, thus going to the display panel 140. In spite of local dimming, the green light $L_G$ and the red light $L_R$ may pass through a region of the display panel 140 corresponding to the off-light source 112b, which may be noise degrading a contrast ratio of a color.

Thus, the selective transmission member 160 may prevent light from going to the region of the display panel 140 in a dimming-off region in local dimming, thereby effectively controlling luminance.

Even the selective transmission member 160 passes through light incident from the light source array 110, a refractive index and a thickness of each material layer may be determined such that a transmissivity and a reflectivity change with an incidence angle. For example, a refractive index and a thickness of each material layer may be designed such that for an incidence angle of 0 degree, a transmissivity is highest, and a transmissivity decreases and a reflectivity increases as the incidence angle increases.

Alternatively, a refractive index, a thickness, etc., of each material layer may be designed such that a transmittivity of a region of the selective transmission member 160, which overlaps with the light-emitting light source 112, may be higher than that of a region of the selective transmission member 160, which does not overlap with the light-emitting light source 112 and a reflectivity of the region of the selective transmission member 160, which overlaps with the light-emitting light source 112, may be lower than that of the region of the selective transmission member 160, which does not overlap with the light-emitting light source 112.

Alternatively, a refractive index, a thickness, etc., of each material layer may be designed such that light incident on the selective transmission member 160 at a certain angle or more has a reflectivity higher than a transmissivity. The certain angle may be determined by a dimming size S of the light source array 110 and a distance D between the light source array 110 and the selective transmission member 160.

Figure 3:
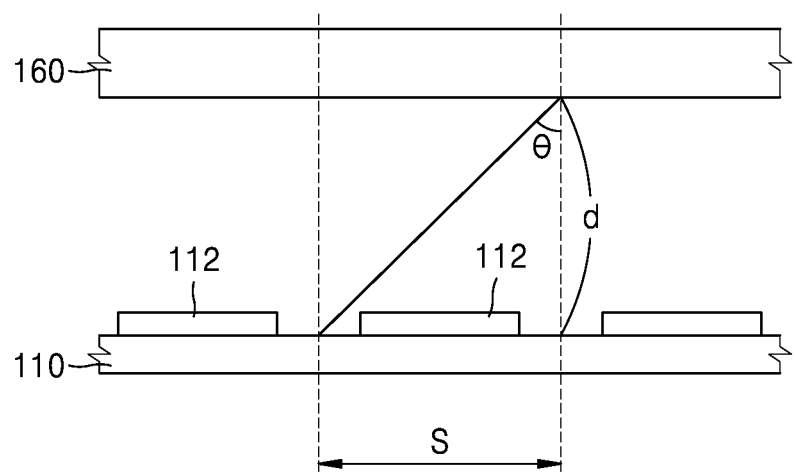
FIG. 3 is a reference view for describing a relationship between a particular angle and a dimming size, according to an embodiment.

FIG. 3 is a reference view for describing a relationship between a particular angle and a dimming size, according to an embodiment. When the light source array 110 performs local dimming in the unit of the light source 112, the size S of local dimming may be a certain range including one light source 112, as shown in FIG. 3.

A tangent of a certain angle θ may the size S of local dimming with respect to the distance D between the selective transmission member 160 and the light source substrate 120.

$$\tan \theta = S/D \qquad \text{[Equation 1]}$$

The light incident at the certain angle θ has a transmissivity higher than a reflectivity, whereas light incident at an angle larger than the certain angle θ may have a reflectivity higher than a transmissivity. Hence, more light emitted from the light source 112 overlapping with the selective transmission member 160 may be incident to the color conversion layer 130, and less light emitted from the light source 112 not overlapping with the selective transmission member 160 may be incident to the color conversion layer 130, thereby more effectively implementing local dimming. For example, a transmissivity of light emitted from a region of the light source 112 not overlapping with the selective transmission member 160 may be less than or equal to about 30% of a transmissivity of light emitted from a region of the light source 112 overlapping with the selective transmission member 160.

As such, light transmission or non-transmission of the selective transmission member 160 may vary with a wavelength of light incident thereto, and a transmittivity and a reflectivity change with an incidence angle, such that luminance control may be effective and color definition may be improved when the light source array 110 operates with a local dimming signal.

The display apparatus 100 may also include various optical members that adjust a traveling path of light. For example, the display apparatus 100 may further include a diffusion plate that diffuses white light emitted from a backlight unit to make overall color and brightness of an image displayed on the display panel 140 uniform, a prism sheet that increases luminance by refracting or gathering the light diffused by the diffusion plate, a dual brightness enhancement film that enhances light gathering power by using polarization characteristics. The display apparatus 100 may also include a heat radiating plate that removes heat generated in the light source 112.

Figure 4:
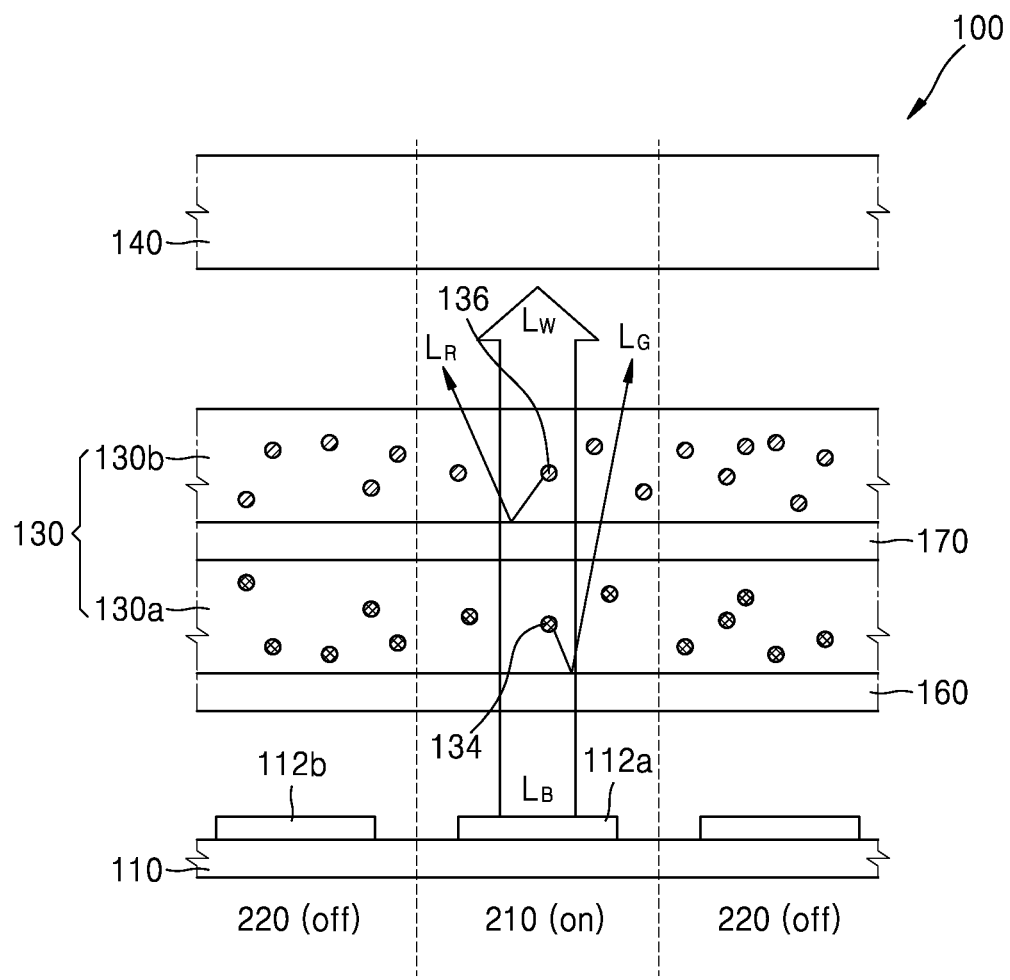
FIG. 4 illustrates a display apparatus including a plurality of selective transmission members, according to an embodiment.

FIG. 4 illustrates a display apparatus 100 including a plurality of selective transmission members 160 and 170, according to an embodiment. Comparing FIG. 1 with FIG. 4, the color conversion layer 130 in FIG. 4 may include a first color conversion layer 130a including the plurality of first color conversion particles 134 that convert blue light $L_B$ into green light $L_G$ and a second color conversion layer 130b including the plurality of second color conversion particles 136 that convert at least one of blue light $L_B$ or green light $L_G$ into red light $L_R$.

The selective transmission member 160 may be arranged between the light source array 110 and the first color conversion layer 130a. The selective transmission member 160 may transmit light incident from the light source array 110 to the first color conversion layer 130a, and may not transmit converted light incident from the first color conversion layer 130a, i.e., the red light $L_R$. The selective transmission member 160 may be identical to the selective transmission member 160 described above with reference to FIG. 1.

Meanwhile, another selective transmission member 170 may be further arranged between the first color conversion layer 130a and the second color conversion layer 130b. The selective transmission member 170 may transmit light incident from the first color conversion layer 130a, e.g., the blue light $L_B$ and the green light $L_G$ to the second color conversion layer 130b, and may not transmit the light converted in the second color conversion layer 130b, i.e., the red light $L_R$. Thus, traveling paths of the green light $L_G$ and the red light $L_R$ respectively in the first color conversion layer 130a and the second color conversion layer 130b are short, such that a probability of light going to the dimming-off region 220 may be reduced.

Figure 5:
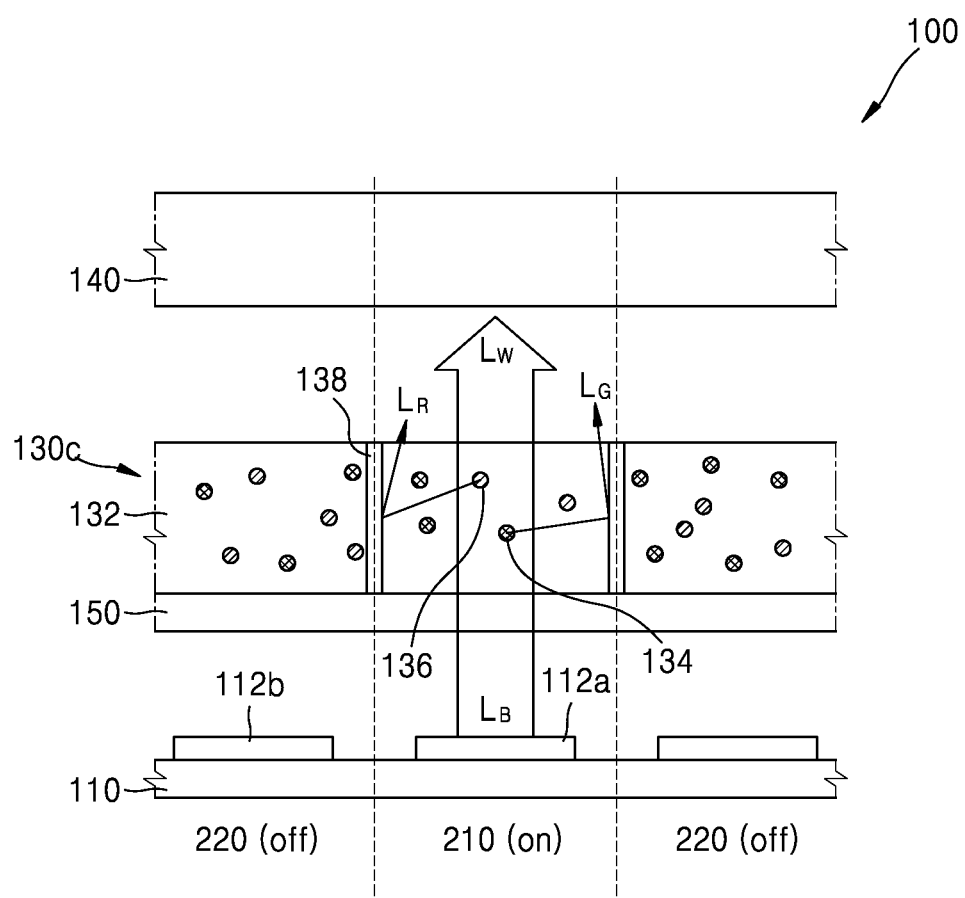
FIG. 5 illustrates a display apparatus according to an embodiment.

FIG. 5 illustrates a display apparatus 100 according to an embodiment. Comparing FIG. 1 with FIG. 5, a color conversion layer 130c of FIG. 5 may include a plurality of barriers 138 arranged spaced apart from each other in the color conversion layer 130c. The plurality of barriers 138 may be parallel with an arrangement direction of the light sources 112 of the light source array 110.

The barrier 138 may be arranged in a region of the color conversion layer 130c, which does not overlap with the light sources 112, to partition a local dimming region. Although it is illustrated that the barrier 138 is arranged for each light source 112, the disclosure is not limited thereto. When a plurality of light sources are grouped to define a local dimming region, the barrier 138 may be arranged spaced in the unit of a plurality of grouped light sources. The barrier 138 may include a reflective material. Hence, a light density of the dimming-on region 210 of the color conversion layer 130 may be improved.

Figure 6:
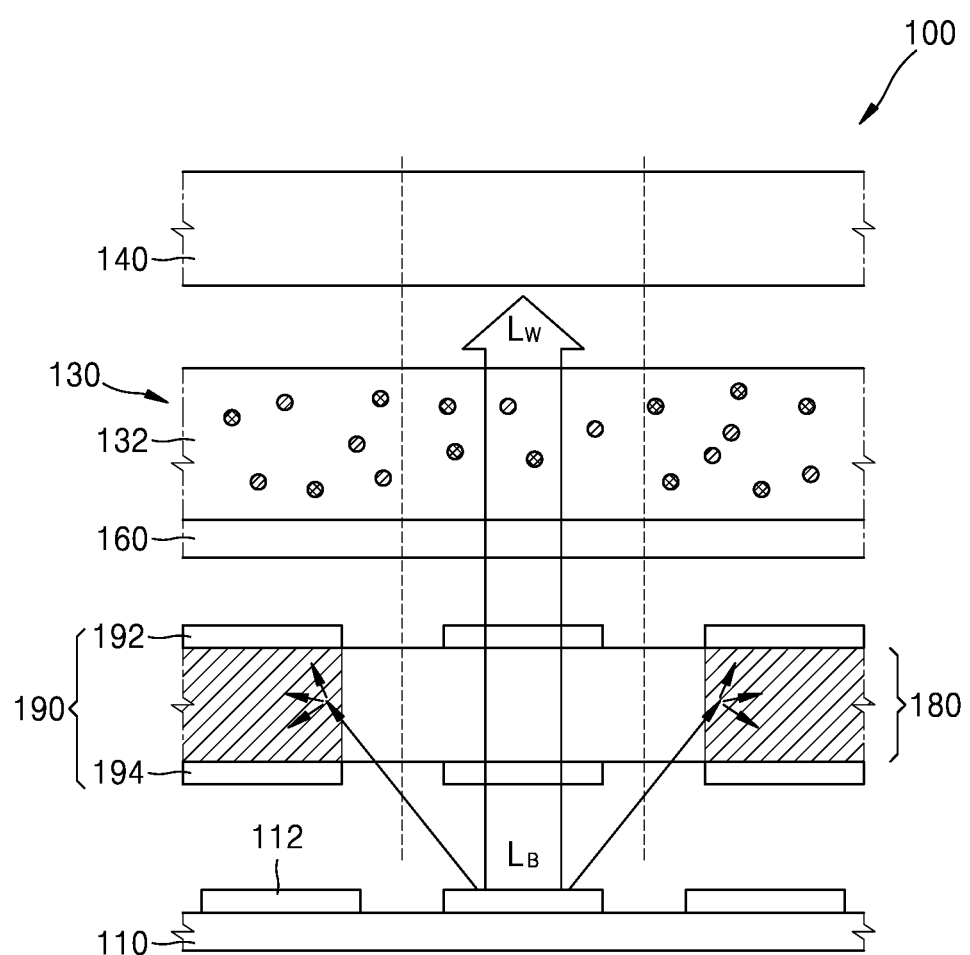
FIG. 6 illustrates a display apparatus including an electro-optic layer, according to an embodiment.

FIG. 6 illustrates a display apparatus 100 including an electro-optic layer 180 according to an embodiment. Comparing FIG. 1 with FIG. 6, as shown in FIG. 6, the display apparatus 100 may further include the electro-optic layer 180 capable of adjusting a transmissivity with respect to the selective transmission member 160 based on optical characteristics thereof that change with an applied electric signal. The electro-optic layer 180 may include a plurality of electro-optic particles having optical characteristics that change with an electric signal.

The display apparatus 100 may further include an electrode part 190 that applies an electric signal to the electro-optic layer 180. The electrode part 190 may include a plurality of electrode pairs 192 and 194 arranged spaced with the electro-optic layer 180 therebetween. The plurality of electrode pairs 192 and 194 may be arranged spaced in the unit of a dimming region. For example, each of the plurality of electrode pairs 192 and 194 may be arranged corresponding to each of the plurality of light sources. More specifically, each of the plurality of electrode pairs 192 and 194 may be arranged overlappingly with the corresponding light source 112.

The electro-optic particles are substances having an electro-optic effect. The electro-optic effect is a phenomenon in which optical characteristics change with an electric field, and a refractive index, a phase delay, polarization characteristics, etc., of electro-optic particles may change with presence or absence of an electric field and/or a strength of the electric field.

The electro-optic particles may include liquid crystal. At least one of a refractive index or polarization characteristics of the liquid crystal may change with presence or absence of an electric field and/or a strength of the electric field. For example, polymer dispersed liquid crystal (PDLC), polymer network liquid crystal (PNLC), cholesteric liquid crystal, smectic liquid crystal, etc., may be used as electro-optic particles.

Upon application of an electric field to the electro-optic layer 180, the electro-optic particles may identically refract incident light. In other words, light incident on the electro-optic particle may be refracted with an identical refractive index regardless of an incidence position, and the light may be refracted in the same direction regardless of the incidence position. Thus, upon application of an electric field to the electro-optic layer 180, the electro-optic particles may become transparent. That is, the electro-optic particles may transmit the incident light.

When the electric field is not applied to the electro-optic layer 180, the electro-optic particles may refract incident light with a different refractive index in a different direction according to a position. In other words, the light incident on the electro-optic particle may be refracted at a different refractive index according to a position in which the light is incident. Thus, when the electric field is not applied to the electro-optic particle, the electro-optic particle may become opaque. That is, the electro-optic particles may scatter the incident light.

For example, an electric signal may be applied to an electrode pair arranged on the dimming-on region 210, and an electric signal may not be applied to an electrode pair arranged on the dimming-off region 220. Light traveling on the dimming-on region 210 may go straight due to absence of an influence of an electro-optic particle and may be incident to the selective transmission member 160. On the other hand, when the light traveling on the dimming-off region 220 is incident to the electro-optic layer 180, the light may be scattered by the electro-optic particle. Thus, the amount of light incident on the selective transmission member 160 may be reduced.

The electro-optic particle may include an electro-wetting material in addition to liquid crystal. Electro-wettability may mean that surface tension of liquid is changed using electricity, and upon application of an electric signal, wettability of an electro-wetting material increases, thus scattering incident light, and unless the electric signal is not applied, the wettability decreases, reducing disturbance of the traveling path of light.

While it is illustrated in FIG. 6 that the electro-optic layer 180 is arranged between the light source array 110 and the selective transmission member 160, the disclosure is not limited thereto.

Figure 7:
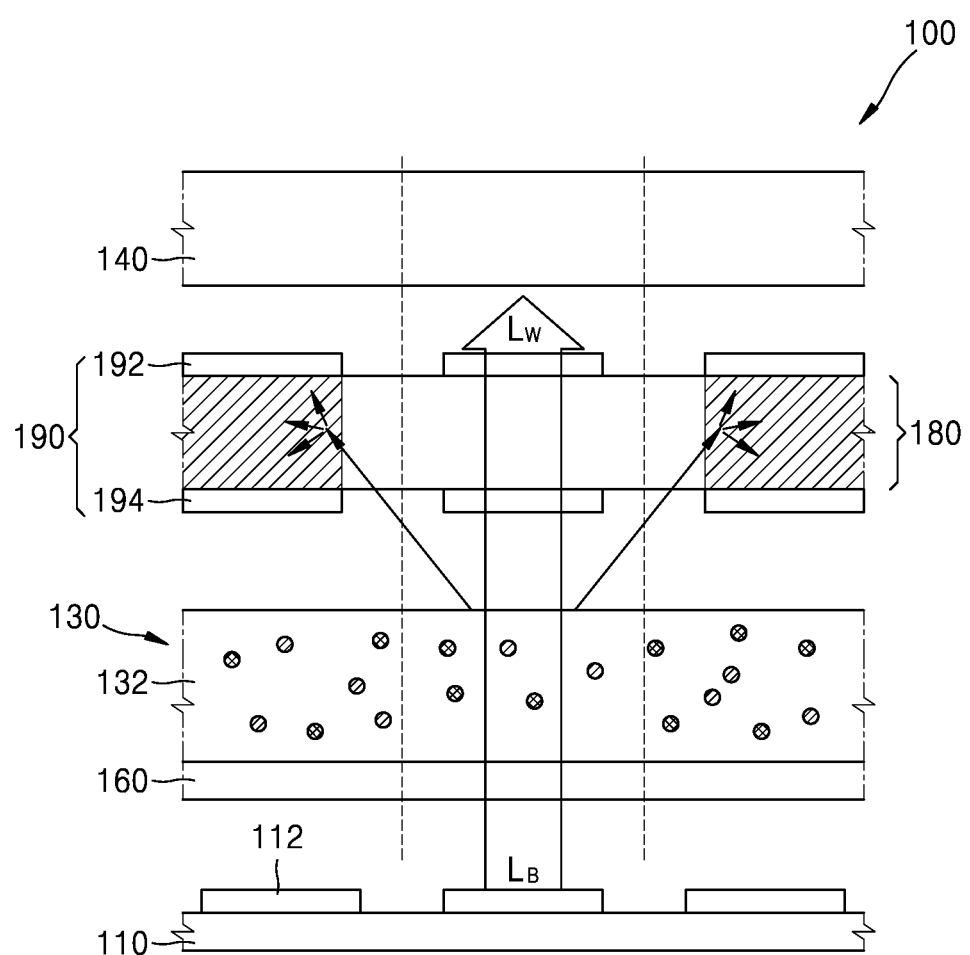
FIG. 7 illustrates a display apparatus including an electro-optic layer, according to an embodiment.

FIG. 7 illustrates a display apparatus 100 including the electro-optic layer 180 according to an embodiment. As shown in FIG. 7, the electro-optic layer 180 may be arranged between the color conversion layer 130 and the display panel 140. When the electro-optic layer 180 is arranged between the color conversion layer 130 and the display panel 140, white light $L_W$ may be prevented from being incident to a region of the display panel 140 arranged in the dimming-off region 220.

A display apparatus capable of performing such local dimming may be implemented in various forms such as a TV, a monitor, a portable multimedia device, a portable communication device, a portable computing device, etc., to visually display an image. In particular, the display apparatus capable of performing local dimming may be useful for a display apparatus that projects an image to a real environment to implement augmented reality (AR) where the image appears to exist in the real environment, e.g., a head-up display or a see-through display.

Figure 8:
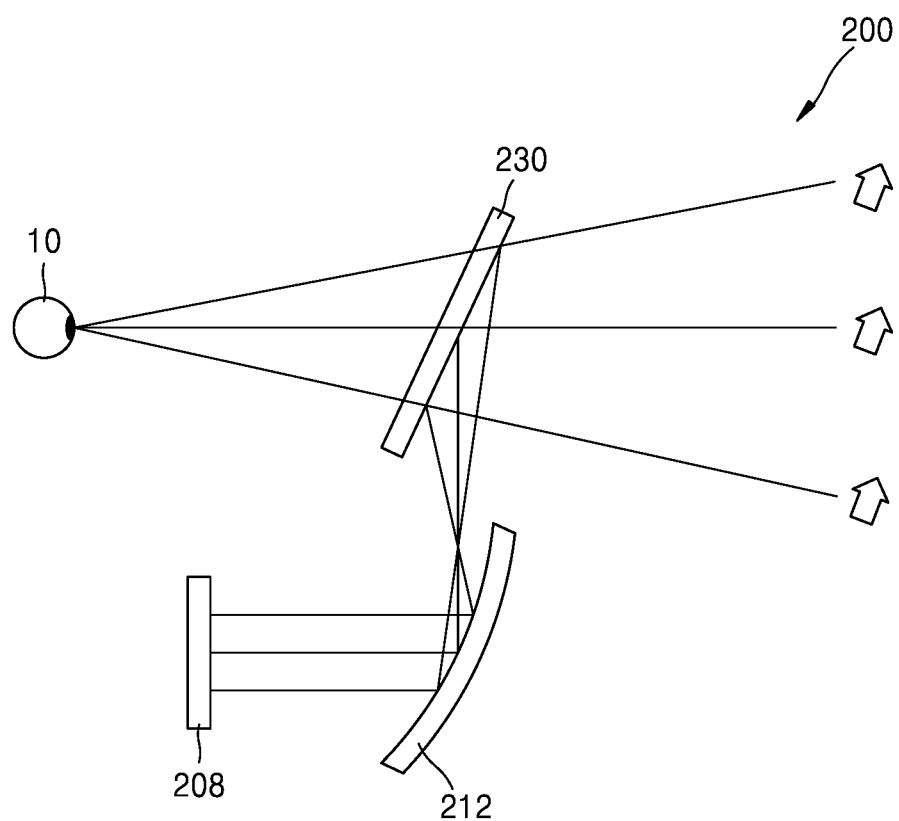
FIG. 8 illustrates a head-up display apparatus, according to an embodiment.

FIG. 8 illustrates an example of a head-up display apparatus 200. As shown in FIG. 8, the head-up display apparatus 200 may include a spatial light modulator 208, an image enlargement member 212 that enlarges an image generated in the spatial light modulator 208, and an image convergence member 230 that converges the enlarged image and an image corresponding to an external environment into a certain space. The certain space may be a user's visual organ 10, e.g., a pupil.

The spatial light modulator 208 may include the above-described display apparatus 100. The spatial light modulator 208 according to an embodiment may provide an image by using light sources arranged two-dimensionally, thereby providing an image having a higher resolution than a spatial light modulator of a scanning type. With the head-up display apparatus 200, the user does not need to directly see the spatial light modulator 208 to recognize the image. Thus, the spatial light modulator 208 may be small.

Meanwhile, an image generated in the small spatial light modulator 208 is also small, such that the image enlargement member 212 may enlarge an image generated in the display apparatus 100. The image enlargement member 212 may enlarge the image corresponding to a range of an angle of view or field of view. The image enlargement member 212 may be an optical member such as a convex lens, etc.

The image convergence member 230 may change at least one of an optical path of the enlarged image or an optical path of a real environment for convergence into one region, i.e., a user's visual organ 10. The image convergence member 230 may include a beam splitter, a transflective film, a fold mirror, an anisotropic mirror, etc.

Although not shown, a lens may be further arranged between the image convergence member 230 and the user's visual organ 10. The lens is arranged close to the visual organ, such that the focal length of the lens may be shorter than the diameter of the lens. As a result, a wide angle of view or field of view may be easily secured. The lens may be an anisotropic mirror, more specifically, a polarization-dependent birefringence lens.

As such, when the image generated in the small spatial light modulator 208, i.e., the display apparatus is recognized together with the external environment, brightness and definition of the image may be important factors. The display apparatus 100 according to an embodiment may improve the quality of the image by implementing local dimming, thus being useful for a head-up display apparatus.

The display apparatus according to an embodiment may improve a contrast ratio by local dimming.

By applying the display apparatus according to an embodiment to the head-up display apparatus, an image having a high resolution and an enhanced contrast ratio may be provided.

So far, the disclosure has been described with reference to the embodiments of the disclosure. It would be understood by those of ordinary skill in the art that the disclosure may be implemented in a modified form without departing from the essential characteristics of the current embodiment the disclosure. Descriptions of features or aspects within each embodiment of the disclosure should typically be considered as available for other similar features or aspects in other embodiments of the disclosure. The range of the embodiments of the disclosure will be in the appended claims, and all of the differences in the equivalent range thereof should be understood to be included in the embodiments of the disclosure.

What is claimed is:

1. A display apparatus comprising:
a light source array comprising a plurality of light sources comprising a first light source positioned in a dimming-on region of the light source array and a second light source positioned in a dimming-off region of the light source array;
a controller configured to control the plurality of light sources to emit light by a local dimming;
a color conversion layer comprising color conversion particles configured to convert the emitted light into light of a certain color, the color conversion layer being configured to emit white light by using the converted light;
a display panel configured to generate an image by using the white light; and
a selective transmission member which is arranged between the light source array and the color conversion layer and configured to transmit the light emitted by the plurality of light sources to the color conversion layer and prevent the light having been transmitted to the color conversion layer and converted into the light of the certain color in the color conversion layer from being transmitted back to the light source array; and
an electro-optic layer disposed between the display panel and the selective transmission member and configured to adjust a transmissivity of the light with respect to the selective transmission member based on optical characteristics of the electro-optic layer that change based on an applied electric signal,
wherein the controller is further configured to control the first light source positioned in the dimming-on region to be in an on state and emit the light, and control the second light source positioned in the dimming-off region to be in an off state to not emit the light,
wherein the selective transmission member comprises a plurality of regions comprising:
a first region corresponding to the dimming-on region where the first light source is positioned and from where the light is emitted by the light source array, and
a second region corresponding to the dimming-off region where the second light source is positioned and from where the light is not emitted, and
wherein the selective transmission member is configured to transmit the light emitted by the first light source to the color conversion layer as a transmissivity with respect to the light emitted from the first light source that is highest when an incidence angle of the light emitted from the first light source to the selective transmission member is 0 degrees with respect to a vertical axis direction, and decreases as an absolute value of the incidence angle of the light emitted from the first light source increases, and prevent the light having been transmitted to the color conversion layer and converted into the light of the certain color in the color conversion layer from being transmitted back to the light source array, based on a refractive index and a thickness of each material layer included in the selective transmission member, such that the first region, which corresponds to the dimming-on region and on which the light emitted from the first light source is incident, has a transmissivity that is greater than a transmissivity of the second region which corresponds to the dimming-off region and on which the light emitted from the first light source is incident, in accordance with the refractive index and the thickness of each material layer included in the selective transmission member.

2. The display apparatus of claim 1, wherein the selective transmission member totally reflects the converted light incident thereon.

3. The display apparatus of claim 1, wherein light, that is incident on the selective transmission member at the incidence angle, an absolute value of which is equal to or greater than a certain angle with respect to the vertical axis direction, has a reflectivity that is greater than a transmissivity, with respect to the selective transmission member.

4. The display apparatus of claim 3, wherein the certain angle is determined based on a length of a region in which the local dimming is performed, with respect to a lengthwise direction of the light source array, and a distance between the light source array and the selective transmission member.

5. The display apparatus of claim 1, wherein the first region comprises a region overlapping with the first light source that emits the light.

6. The display apparatus of claim 1, wherein the transmissivity of the second region is less than or equal to 30% of the transmissivity of the first region.

7. The display apparatus of claim 1, wherein the selective transmission member comprises a combination of a plurality of material layers having different refractive indices.

8. The display apparatus of claim 1, wherein the color conversion particles comprise quantum dots.

9. The display apparatus of claim 1, wherein the color conversion layer further comprises a plurality of barriers arranged spaced in parallel in a direction in which the plurality of light sources are arranged.

10. The display apparatus of claim 9, wherein at least one of the plurality of barriers comprises a reflective material.

11. The display apparatus of claim 9, wherein the plurality of barriers are arranged in a region of the color conversion layer that does not overlap with the plurality of light sources.

12. The display apparatus of claim 1, wherein the color conversion layer further comprises:

a first color conversion layer comprising first color conversion particles that convert blue light into green light; and a second color conversion layer comprising second color conversion particles that convert the blue light into red light.

13. The display apparatus of claim 12, further comprising:

another selective transmission member arranged between the first color conversion layer and the second color conversion layer, and configured to transmit the blue light and the green light and reflect the red light.

14. The display apparatus of claim 1, further comprising:

an electrode part configured to apply the applied electric signal to the electro-optic layer.

15. The display apparatus of claim 14, wherein the electrode part comprises a plurality of electrode pairs arranged to respectively correspond to the plurality of light sources with the electro-optic layer therebetween.

16. The display apparatus of claim 14, wherein the electro-optic layer comprises at least one of a liquid crystal or an electro-wetting material that have optical characteristics that change based on the applied electric signal.

17. The display apparatus of claim 1, further comprising:

an image enlargement member configured to enlarge the image generated in the display panel; and an image convergence member configured to converge the enlarged image and an image corresponding to an external environment into a certain space.

18. The display apparatus of claim 17, wherein the image convergence member comprises at least one of a beam splitter, a transflective film, a fold mirror, or an anisotropic mirror.

* * * * *